(12) United States Patent
Lim et al.

(10) Patent No.: US 11,259,166 B1
(45) Date of Patent: Feb. 22, 2022

(54) TIP SUBMIT METHOD, APPARATUS, AND SYSTEM FOR PUBLIC-SAFETY TIP SUBMISSIONS

(71) Applicant: MOTOROLA SOLUTIONS, INC., Chicago, IL (US)

(72) Inventors: Bing Qin Lim, Jelutong (MY); Chong Keat Chua, Ayer Itam (MY); Wei Hong Tew, Simpang Ampat (MY); Zhe Qian Goh, Simpang Ampat (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/030,412

(22) Filed: Sep. 24, 2020

(51) Int. Cl.
*H04W 4/90* (2018.01)
*G06Q 50/26* (2012.01)
*H04W 76/50* (2018.01)

(52) U.S. Cl.
CPC .............. *H04W 4/90* (2018.02); *G06Q 50/26* (2013.01); *H04W 76/50* (2018.02)

(58) Field of Classification Search
USPC ........................................ 455/404.1
See application file for complete search history.

(56) References Cited

U.S. PATENT DOCUMENTS

| | | | |
|---|---|---|---|
| 8,250,025 B2* | 8/2012 | Ferraro | G06Q 10/10 707/602 |
| 8,396,447 B2 | 3/2013 | Warner | |
| 8,818,325 B2 | 8/2014 | Hatton | |
| 9,313,177 B2* | 4/2016 | Blumenfeld | G06F 21/6254 |
| 9,426,304 B2* | 8/2016 | Biage | H04W 4/024 |
| 10,136,295 B1 | 11/2018 | Chee et al. | |
| 10,341,836 B2* | 7/2019 | Rowe | G06F 16/9537 |
| 2010/0246781 A1* | 9/2010 | Bradburn | H04M 3/5116 379/45 |
| 2010/0297981 A1 | 11/2010 | Ballantyne et al. | |
| 2011/0281546 A1 | 11/2011 | Libkind | |
| 2015/0234837 A1* | 8/2015 | Rowe | H04W 4/90 707/769 |
| 2019/0304042 A1* | 10/2019 | Santell | G06Q 50/26 |

* cited by examiner

*Primary Examiner* — Maria El-Zoobi (57) ABSTRACT

A method and apparatus for recommending that a user dial an emergency number to report an incident is provided herein. During operation, a user submits anonymous information about an incident to a tipping server. The tipping server determines if the incident that the user is reporting is unreported to an emergency number. If the incident remains unreported to an emergency number, the user is provided a suggestion to call an emergency number to report the incident.

13 Claims, 4 Drawing Sheets

TIP SUBMIT METHOD, APPARATUS, AND SYSTEM FOR PUBLIC-SAFETY TIP SUBMISSIONS

BACKGROUND OF THE INVENTION

Knowledge provided to law enforcement from individuals within a community can help keep neighborhoods safe. Providing new ways to connect, beyond calling an emergency number (e.g., 911), will increase engagement and strengthen collaboration between public-safety agencies and the public.

One technique for obtaining knowledge from individuals about public-safety events, beyond calling an emergency number, is through anonymous submission of tips through a dedicated, non-emergency server. For example, Motorola Solution's TipSubmit® is a crime tipping service that empowers citizens to anonymously share information with a quick and simple web submission form. Agencies then have the power to easily manage, share, and act on the anonymous tip information from a dedicated tip management interface.

Although the above tip submission mechanisms provide a user the ability to share information with authorities, there are situations when a user reporting an incident doesn't know that they are actually the first person who is reporting the incident, and it would be beneficial for the user to call an emergency number to report the incident. Therefore a need exists for a tip-submit system that recommends that a user report the incident to an emergency number.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method, apparatus, and system for recommending that a user dial an emergency number to report an incident is provided herein. During operation, a user submits anonymous information about an incident to a tipping server. The tipping server determines if the incident that the user is reporting is unreported to an emergency number. If the incident remains unreported to the emergency number, the user is provided a suggestion to call the emergency number to report the incident.

Optionally, the suggestion will be based on the timeliness of the tip in assisting the incident investigation. For example, if an unreported tip (i.e., unreported to an emergency number) is being reported about a robbery incident that occurred two minutes ago, the user will be requested to dial an emergency number to report the incident. However, if an unreported tip is being submitted about a robbery incident that occurred three weeks ago, the user may not be sent a request to report the incident via an emergency number.

Additionally, the decision to request the user to report the incident via an emergency number may be based on a type of incident. For example, an unreported tip is being submitted about a non-emergency situation, then no request will be made to the user to report the incident to an emergency number. For example, if an unreported tip is being submitted about something that is not illegal (e.g. a group of individuals congregating), then the user may not be requested to report the incident via an emergency number.

It should be noted that the term "emergency number" refers to the enhanced 911, E-911, or E911 is a system used in North America to automatically provide the caller's location to 911 dispatchers. However, in other jurisdictions, the term "emergency number" encompasses any universal emergency telephone number in the region (e.g., European Union, 112) utilized for non-anonymous reporting of public-safety incidents. The calling of the emergency number results in the caller being directed to a live operator, with information about the caller (e.g., name and location) being provided to the operator. Thus, regardless of the actual telephone number utilized, a call to an emergency number is routed to a Public Safety Answering Point (PSAP), which is a call center operated by the local government. At the PSAP, the emergency call is answered by a specially trained official known as an emergency dispatcher. The dispatcher's computer receives information from the telephone company about the physical address (for landlines) or geographic coordinates (for wireless) of the caller. This information is used to dispatch police, fire, medical, and other services as needed.

Figure 1:
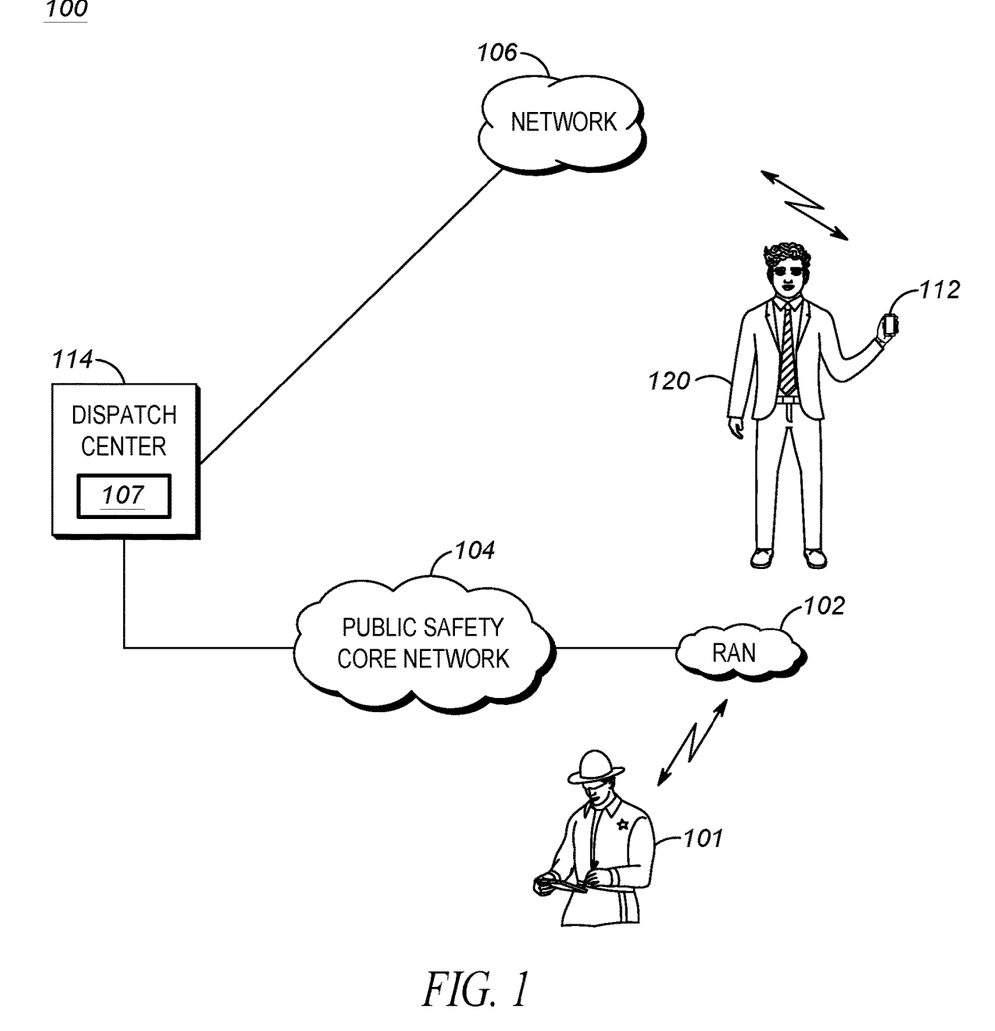
FIG. 1 shows a general operating environment for the present invention.

FIG. 1 illustrates a system for implementing the present invention. System 100 includes one or more radio access networks (RANs) 102, a public-safety core network 104, smart device 112, network 106, tip-submit server 107, and emergency dispatch center 114 serving as a PSAP.

As shown in FIG. 1, several separate networks exist, namely public-safety core network 104, and public network 106 (e.g., Verizon, Spring, AT&T, . . . , etc.). Network 106 may be wired or wireless, and comprises a standard network configured to facilitate standard data transmission between any device 112 and dispatch center 114.

Each RAN 102 includes typical RAN elements such as base stations, base station controllers (BSCs), routers, switches, and the like, arranged, connected, and programmed to provide wireless service to user equipment (e.g., tablet computer operated by officer 101) in a manner known to those of skill in the relevant art.

In a similar manner, network 106 includes elements (which may be shared) such as base stations, base station controllers (BSCs), routers, switches, and the like, arranged, connected, and programmed to provide data service to user equipment 112 (e.g., smart phone or computer 112 operated by user 120) in a manner known to those of skill in the relevant art.

The public-safety core network 104 may include one or more packet-switched networks and/or one or more circuit-switched networks, and in general provides one or more public-safety agencies with any necessary computing and communication needs, transmitting any necessary public-safety-related data and communications to/from officer 101.

Smart device 112 may be any suitable computing and communication devices configured to engage in wired or wireless communication over network 106. Such communication may comprise standard cellular data. For example, smart device 112 may comprise a mobile device running an Android™ or iOS™ operating system and running a tip-submit application.

Dispatch center 114 is part of a computer-aided-dispatch center, preferably manned by an operator and configured to receive E-911 calls and/or anonymous information via a tip-submit service from device 112. Information received from device 112 at dispatch center 114 may be provided/forwarded to officer 101 (via core network 104 and RAN 102). For example, dispatch center 114 typically comprises a graphical user interface that provides the dispatch operator necessary information about public-safety incidents. This information may be accessed by a device carried by an officer.

Finally, tip-submit server 107 is provided. Although server 107 is shown existing within dispatch center 114, in alternate embodiments, server 107 may be located outside of dispatch center 114. When located outside of dispatch center 114, server 107 is connected to dispatch center 114 through an intervening network (e.g., networks 104 or 106).

As discussed, server 107 is configured to receive anonymous submissions of tips. The tips usually comprise reports sent in by users 120 with information about a public-safety incident. In one embodiment of the present invention, server 107 comprises a Motorola Solution's TipSubmit® server that empowers citizens to anonymously share information with a quick and simple web submission form. Dispatch center 114 will then have the power to easily manage, share, and act on the anonymous tip information from a dedicated tip management interface.

During operation, dispatch center 114 is configured to receive anonymous tips from device 112 and route them to server 107. As discussed above, anonymous tips are preferably received as an electronic form. When any anonymous tip is received, information included with the tip is analyzed and a determination is made as to whether or not a suggestion should be provided to the tip submitter to call an emergency number to report the tip. The "suggestion" comprises text that will be displayed on device 112.

As discussed, the determination on whether or not to provide the suggestion to the user is based on at least one factor, such as:
  whether or not the tip has been previously reported to an emergency number;
  whether or not the tip is timely (i.e., received within a predetermined time of the incident happening); and/or
  whether or not the tip is about a high-priority public-safety event.

Additionally, in one embodiment of the present invention, server 107 is configured to receive tip information from device 112 in real time, as the user fills out the form. In other words, device 112 transmits what is typed to server 107 in real time, as user 120 fills out the form. Thus, in one embodiment, each character typed by user 120 may be individually transmitted through network 106 to server 107. This information is acted on as discussed above. Any suggestion to call an emergency number may be based on a subset of data received by device 112, even before user 120 stops typing. Thus, a user may type "There is a house on fire at 123 Main Street". When tip-submit server 107 receives "There is a house on fire", a suggestion may be made to the tipper to call an emergency number, even before "at 123 Main Street" is received by server 107. In another embodiment, "fields" of a tip-submit form will be transmitted to server 107 when they are filled out, prior to all fields of the form being filled out.

During operation, when server 107 determines that a recommendation should be made to a user to report the incident to an emergency number, server 107 will send a trigger to device 112. This trigger could be as simple as a command sent to device 112, or as complicated as a command and information to display. For example, server 107 may simply send a small amount of data to device 112 that triggers device 112 to display a pre-stored message (i.e., stored on device 112) to a user to dial an emergency number. Alternatively, server 107 may send a larger amount of data to device 112 that comprises a message to be displayed on device 112. Regardless, once server 107 determines that the anonymous information provided by device 112 should be reported to an emergency number, device 112 is triggered to provide a message to user 120 to do so. This is illustrated in FIG. 2.

Figure 2:
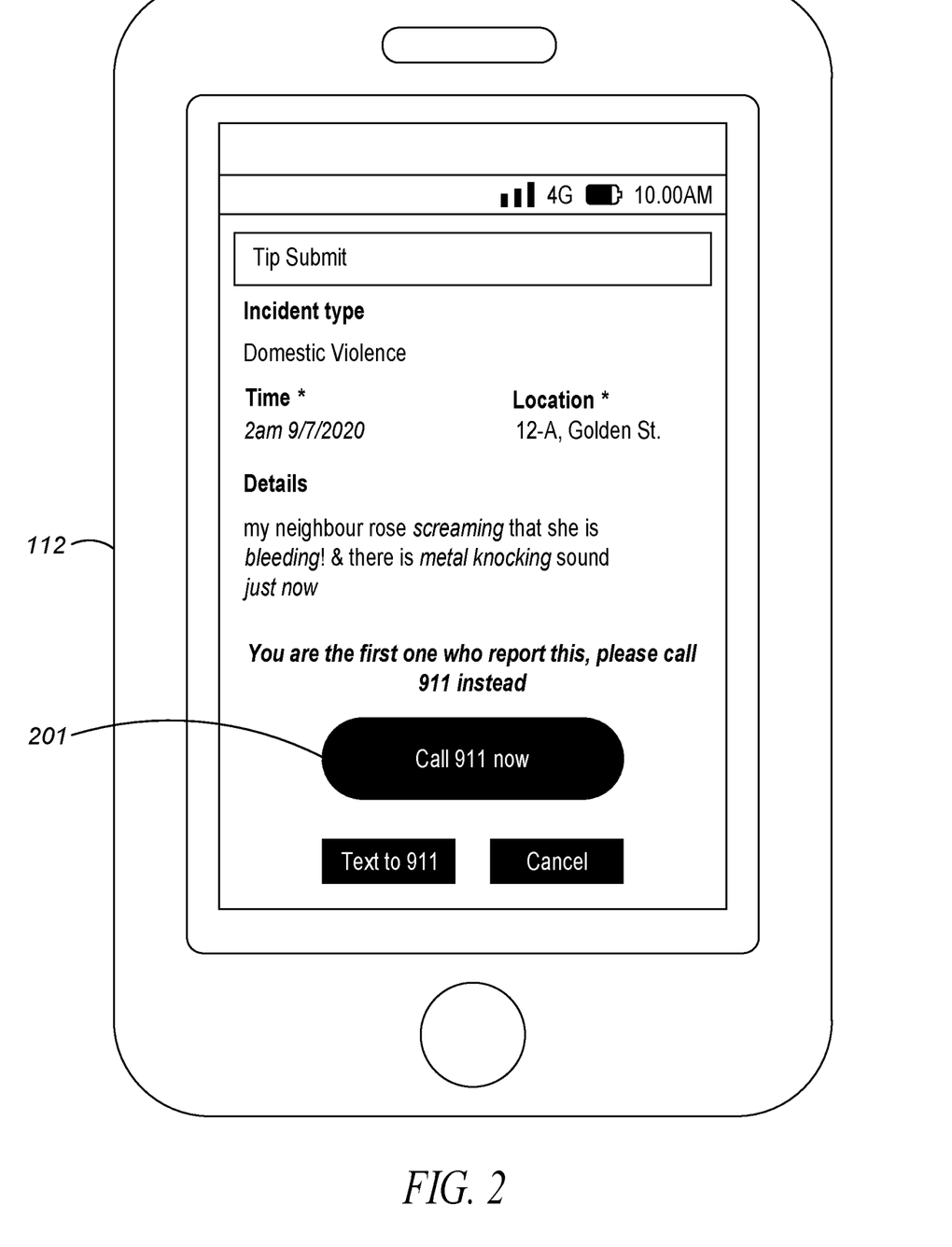
FIG. 2 illustrates a request sent to a user to report an incident to an emergency number.

As shown in FIG. 2, device 112 is triggered to display message 201 to call an emergency number (or alternatively to text an emergency number) to report the information contained within the tip-submit form submitted by the user. The message may be in the form of a soft key, where simply pressing the soft key will cause device 112 to dial or text the emergency number. In other words, a "call" soft key may be provided and configured to dial an emergency number when pressed. Alternatively, a "text" soft key may be provided and configured to text an emergency number when pressed.

As shown in FIG. 2, while the user is still in the progress compiling the text in the tip-submit form, the already-inserted text will be sent to the server 107 to determine if this in-progress reporting incident has been reported to the emergency number. While the user continues to type in the tip-submit form, the additional text or information will be progressively sent to the server 107 to make the decision. When server 107 determines that there are enough information to determine that this in-progress reporting incident has not been reported to emergency number before, then the device 112 would be configure to display message 201 to the in-progress tip-submit form (for example, removing a certain field entry from the form to display the message 201).

As illustrated in FIG. 2, the information that the user has already typed into the tip submit form (for example, incident type of "Domestic Violence", time information of "2 am 9/7/2020", location information of "12-A, Golden St." and the detail information of "my neighbor Rose screaming that she is bleeding! & there is metal knocking sound just now" will be sent to the server 107 prior to the user completing the form. At server 107, the received information from device 112 will be compared to information received from the emergency number at dispatch center 114 (for example, a transcript of the call information received from the emergency number will be and stored in server 107. For example, the server 107 will compare and determine if there is a domestic violence incident reported through the emergency number having the same (or similar) reported time, reported location (or adjacent area), and/or similar description of the public safety incident (based on keywords matching, synonyms keywords matching, and/or natural language processing).

In one embodiment, the reported time information "2 am 9/7/2020" is used to determine the timeliness of the reported tip. For example, if the time information is a recent time (for example, 3 minutes ago) then the timeliness value is high and thus text 201 will be displayed; while if the time information is a longer time ago (for example, 1 week ago) then the timeliness value is low and thus no text 201 will be displayed.

In one embodiment, the reported incident type information "Domestic Violence" and/or the information or keywords from the details (for example, "screaming", "bleeding", and "metal knocking" etc) is used to determine whether it is a high-priority public safety incident. In one example, it is done by comparing the received text to a lookup table that stores text related to incidents of high-priority.

Figure 3:
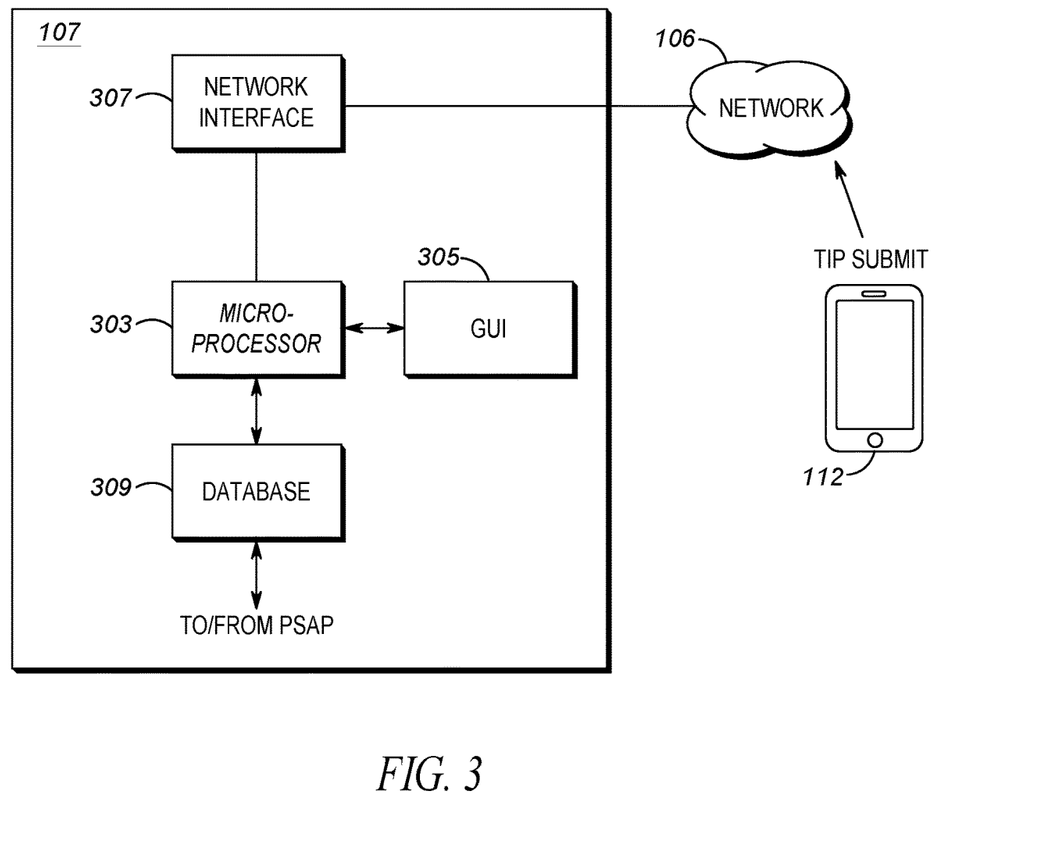
FIG. 3 is a block diagram of the server of FIG. 1.

FIG. 3 is a block diagram of server 107. Server 107 preferably includes graphical user interface (GUI) 305, network interfaces 307, database 309, and logic circuitry 303. In other implementations, server 107 may include more, fewer, or different components.

Graphical user Interface (GUI) 305 serves as a tip management interface and comprises a screen (e.g., a liquid crystal display (LCD), organic light-emitting diode (OLED) display, surface-conduction electron-emitter display (SED), plasma display, field emission display (FED), bistable display, projection display, laser projection, holographic display, etc.) that can display anonymous tips received from device 112. In order to provide the above features (and additional features), GUI 305 may include a monitor, a keyboard, a mouse, and/or various other hardware components to provide a man/machine interface.

Logic circuitry 303 comprises a digital signal processor (DSP), general purpose microprocessor, a programmable logic device, or application specific integrated circuit (ASIC) and is configured to determine if an anonymous tipper should be directed to report the tip to an emergency number, and if so, trigger device 112 to display a message requesting user 120 report the tip via an emergency number.

In an illustrative embodiment, network 106 is attached (i.e., connected) to server 107 through network interface 307 and communicates with processor 303. Network 106 is connected via a wired connection to network interfaces 307, although this connection may be wireless in alternative embodiments. Network interface 307 includes elements including processing, modulating, and transceiver elements that are operable in accordance with any one or more standard or proprietary wired or wireless interfaces, wherein some of the functionality of the processing, modulating, and transceiver elements may be performed by means of processor 303.

Database 309 is provided. Database 309 comprises standard memory (such as RAM, ROM, . . . , etc) and serves to store past incidents reported to an emergency number. The incidents may be stored as a series of computer-aided dispatch (CAD) incident identifiers. More particularly, an incident identification (sometimes referred to as an incident scene identifier, or a CAD incident identifier (CAD ID), or Incident Number) is generated for incidents where an officer is dispatched/assigned, or where an officer encounters a public-safety event. This ID is associated with populated fields (e.g., time, location, incident type, . . . , etc.). Database 309 is preferably populated in real time with information about incidents reported to dispatch center 114. As such, database 309 will be coupled to a PSAP so that the data may be populated.

Additionally, database 309 may also contain words or statements that, when used in a tip submit, trigger logic circuitry 303 to display a message on device 112 to report the tip to an emergency number. For example, logic circuitry 303 may determine that an anonymous tip has not been previously reported to an emergency number, however, unless the tip contains words or statements that are contained within database 309, a request will not be sent to user 120 to report the incident to an emergency number.

During operation, network interface 307 receives information (e.g., text) regarding an anonymous tip. The anonymous tip is preferably about a public-safety incident such as a crime, fire, natural disaster, . . . , etc. This information may be in the form of a tip-submit pre-populated form, or as discussed above, may comprise real-time text as it is being typed into a tip-submit form. Regardless of the way the anonymous information is received, network interface 307 passes the anonymous information to logic circuitry 303, where logic circuitry 303 determines if a request should be sent to the submitter to report the anonymous tip to an emergency number. More particularly, logic circuitry 303 determines if device 112 should be triggered to display the request. If it is decided that device 112 should be triggered, then logic circuitry 303 sends a trigger (via network interface 307 and network 106) to device 112 to display the request. The "trigger" preferably comprises digital information (e.g., a bit) in the form of a standard message between device 112 and logic circuitry 303.

As discussed, above, logic circuitry 303 determines whether or not a request should be made to user 120 to report the incident to an emergency number based on one or more of three variables; namely, whether or not the tip has been previously reported to an emergency number, whether or not the tip is timely (i.e., received within a predetermined time of the incident happening); and/or whether or not the tip is about a high-priority public-safety event. Thus, logic circuitry maps one or all of these variables to whether or not a request should be made. The mapping process preferably comprises an operation that associates each element of a given set (the domain) with one or more elements of a second set (the range). The above-described variables comprises the domain, while the decision to send the request comprises the range. The mapping may be explicit based on predefined rules, or the mapping may be trained via neural network modeling.

Logic circuitry 303 thus maps whether or not the tip has been previously reported to an emergency number (x), whether or not the tip is timely (y), and/or text within the tip (z) (indicating whether or not the tip is about a high-priority public-safety event) to whether or not a request should be made (f). More specifically, it can be said that that f "takes the value" or "maps to" f(x, y, z) at x, y, and z. The set of all possible x, y, and z is called the domain of the function f. The set of possible outcomes of f(xyz) is called the range. The range preferably comprises a "yes" or a "no" as to whether or not to trigger device 112 to request the tip be reported to an emergency number. Thus, the mapping process preferably comprises an operation that associates each element of a given set (the domain) with one or more elements of a second set (the range). Thus:

whether or not to send a request=Function(x, y, z).

In alternate embodiments of the present invention, other information may be utilized to determine if device 112 should be triggered to display a request to dial an emergency number. For example, if there are two or more users who are filling the tip-submit form at the same time, and are reporting the same incident (determined based on a correlation/cross checking of reported words, then the server 107 may simply instruct both to dial an emergency number, or alternatively determine who among the two and more users to suggest to call the emergency number, based on:

(i) which reporter is further from the reported incident location (for example, if the incident type selected in the tip submit form is a dangerous type, said robbery, select the user whose device 112 location (based on a user optionally reporting their location information) is further from the reported incident location); or (ii) which reporter is nearer to the reported incident location (for example, if the incident type selected in the tip submit form is a non-dangerous type, said heart attack, select the user whose device 112 location (based on device 112 location being optionally reported by a user) is nearer to the reported incident location).

Considering the above discussion, FIG. 3 shows an apparatus comprising a network interface 307 configured to receive an anonymous tip about a public-safety incident from a device 112. A database 309 is provided comprising non-anonymous, past-reported incidents made to an emergency number via call or text. Finally, logic circuitry 303 is provided, and configured to analyze the anonymous tip and the database to determine if the public-safety incident has been previously reported via the emergency number, and trigger the device to request a user report the anonymous tip to the emergency number when the public-safety incident has not been previously reported to the emergency number.

As discussed above, the logic circuitry can be further configured to trigger the device to request the user to report the anonymous tip to the emergency number when the public-safety incident has not been previously reported to the emergency number and the anonymous tip is received within a predetermined time period of the public-safety incident happening. In other words, a timestamp of when the anonymous tip is received (as determined from an internal clock (not shown in FIG. 3) will be compared by logic circuitry 303 to when the user indicated the incident happened (i.e., as indicated in the tip-submit form). If the tip is timely (e.g., within 5 minutes), a trigger will be sent to device 112 to display a message to the user requesting a user report the incident to an emergency call number.

Logic circuitry 303 can be further configured to analyze text within the anonymous tip to determine a priority level. This is preferably accomplished by determining if any text within the anonymous tip matches text contained within database 309. If text within the anonymous tip matches text within database 309, then the priority level of the anonymous tip is increased by logic circuitry 303. The more words that match between database 309 and the anonymous tip, the greater the priority level of the anonymous tip will become. Logic circuitry will then trigger device 112 to request the user to report the anonymous tip to the emergency number when the public-safety incident has not been previously reported to the emergency number and the anonymous tip has a priority level above a threshold (e.g., two words matching between the anonymous tip and the wording contained within database 309).

As discussed above, the anonymous tip may be received in real time, as a user types the anonymous tip on the device.

As discussed above, when two or more tips are received simultaneously (or within a predetermined period of time (e.g., 5 minutes)), logic circuitry 3030 will also be configured to determine that the two or more devices have submitted anonymous tips on the public-safety incident, determine a location of the two or more devices, and trigger only one device from the two or more devices to request the user to report the anonymous tip to the emergency number when the public-safety incident has not been previously reported to the emergency number and the one device is a closest or farthest device to the public-safety incident.

It should be noted that in order to determine the location of a device, logic circuitry 303 may retrieve this information from the actual anonymous tip if the user has provided such information. In other words, because of the anonymity a user may choose to not report their location. However, if a user does report their location (a proxy for the device location), this information may be used accordingly.

Figure 4:
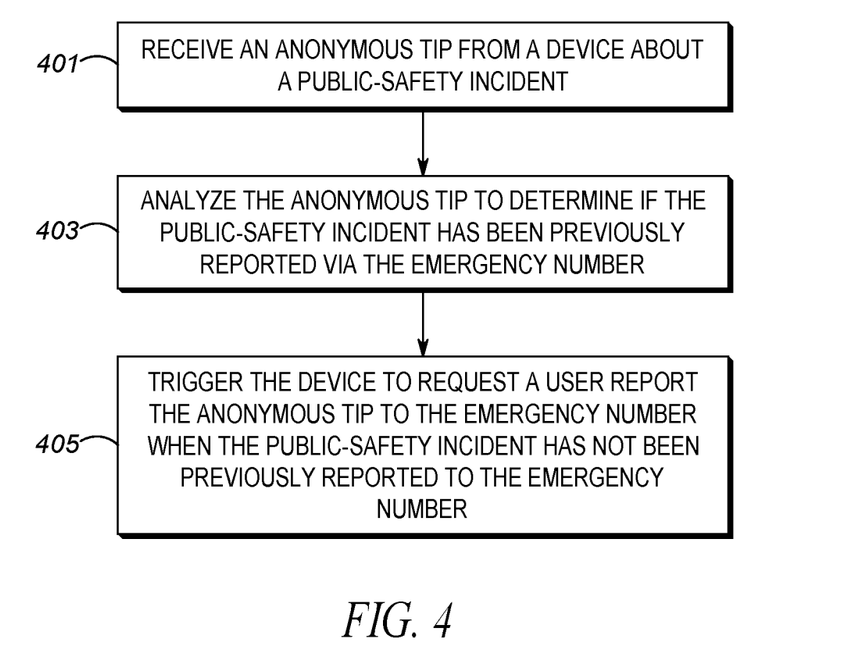
FIG. 4 is a flow chart showing operation of the server of FIG. 3.

FIG. 4 is a flow chart showing operation of the server of FIG. 3. The logic flow begins at step 401 where logic circuitry receives an anonymous tip from a device about a public-safety incident. At step 403, logic circuitry 303 analyzes the anonymous tip to determine if the public-safety incident has been previously reported via the emergency number, and at step 405 triggers the device to request a user report the anonymous tip to the emergency number when the public-safety incident has not been previously reported to the emergency number.

As discussed above, the step of triggering the device may comprise the step of triggering the device to request the user to report the anonymous tip to the emergency number when the public-safety incident has not been previously reported to the emergency number and the anonymous tip is received within a predetermined time period of the public-safety incident happening.

Additionally, text within the anonymous tip may be analyzed to determine a priority level, and the step of triggering the device comprises the step of triggering the device to request the user to report the anonymous tip to the emergency number when the public-safety incident has not been previously reported to the emergency number and the anonymous tip has a priority level above a threshold.

As discussed, the step of receiving the anonymous tip may comprise the step of receiving the anonymous tip in real time, as a user types the anonymous tip on the device.

Optional steps not shown in FIG. 4 may be provided such as determining that two or more devices have submitted anonymous tips on the public-safety incident, determining a location of the two or more devices, and wherein the step of triggering comprises the step of triggering only one device from the two or more devices to request the user to report the anonymous tip to the emergency number when the public-safety incident has not been previously reported to the emergency number and the one device is a closest or farthest device to the public-safety incident.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a network interface configured to receive an anonymous tip about a public-safety incident from a device;
   a database comprising non-anonymous, past-reported incidents made to an emergency number via call or text;
   logic circuitry configured to analyze the anonymous tip and the database to determine if the public-safety incident has been previously reported via the emergency number, and trigger the device to request a user report the anonymous tip to the emergency number when the public-safety incident has not been previously reported to the emergency number.

2. The apparatus of claim 1 wherein:
   the logic circuitry is further configured to trigger the device to request the user to report the anonymous tip to the emergency number when the public-safety incident has not been previously reported to the emergency number and the anonymous tip is received within a predetermined time period of the public-safety incident happening.

3. The apparatus of claim 1 wherein:
   the logic circuitry is further configured to:
   analyze text within the anonymous tip to determine a priority level; and
   trigger the device to request the user to report the anonymous tip to the emergency number when the public-safety incident has not been previously reported to the emergency number and the anonymous tip has a priority level above a threshold.

4. The apparatus of claim 1 wherein the anonymous tip is received in real time, as a user types the anonymous tip on the device.

5. The apparatus of claim 1 wherein the logic circuitry is also configured to:
   determine that two or more devices have submitted anonymous tips on the public-safety incident;
   determine a user-reported location of the two or more devices, wherein the user-reported location comprises a user input into the anonymous tip; and
   trigger only one device from the two or more devices to request the user to report the anonymous tip to the emergency number when the public-safety incident has not been previously reported to the emergency number and the one device is a closest device to the public-safety incident.

6. The apparatus of claim 1 wherein the logic circuitry is also configured to:
determine that two or more devices have submitted an anonymous tip on the public-safety incident;
determine a user-reported location of the two or more devices from user information inserted within the anonymous tip; and
trigger only one device from the two or more devices to request the user to report the anonymous tip to the emergency number when the public-safety incident has not been previously reported to the emergency number and the one device is a farthest device to the same incident.

7. A method comprising the steps of:
receiving an anonymous tip from a device about a public-safety incident;
analyzing the anonymous tip to determine if the public-safety incident has been previously reported via an emergency number;
triggering the device to request a user report the anonymous tip to the emergency number when the public-safety incident has not been previously reported to the emergency number.

8. The method of claim 7 wherein the step of triggering the device comprises the step of triggering the device to request the user to report the anonymous tip to the emergency number when the public-safety incident has not been previously reported to the emergency number and the anonymous tip is received within a predetermined time period of the public-safety incident happening.

9. The method of claim 7 further comprising the step of:
analyzing text within the anonymous tip to determine a priority level; and
wherein the step of triggering the device comprises the step of triggering the device to request the user to report the anonymous tip to the emergency number when the public-safety incident has not been previously reported to the emergency number and the anonymous tip has a priority level above a threshold.

10. The method of claim 7 wherein the step of receiving the anonymous tip comprises the step of receiving the anonymous tip in real time, as a user types the anonymous tip on the device.

11. The method of claim 7 further comprising the step of:
determining that two or more devices have submitted anonymous tips on the public-safety incident;
determining a user-reported location of the two or more devices from user information input into the anonymous tips; and
wherein the step of triggering comprises the step of triggering only one device from the two or more devices to request the user to report the anonymous tip to the emergency number when the public-safety incident has not been previously reported to the emergency number and the one device is a closest device to the public-safety incident.

12. The method of claim 7 further comprising the step of:
determining that two or more devices have submitted anonymous tips on the public-safety incident;
determining a user-reported location of the two or more devices from user information inserted within the anonymous tips; and
wherein the step of triggering comprises the step of triggering only one device from the two or more devices to request the user to report the anonymous tip to the emergency number when the public-safety incident has not been previously reported to the emergency number and the one device is a farthest device to the same incident.

13. A method comprising the steps of:
receiving an anonymous tip from a device about a public-safety incident;
analyzing the anonymous tip to determine if the public-safety incident has been previously reported via the emergency number;
triggering the device to request a user report the anonymous tip to the emergency number when the public-safety incident has not been previously reported to the emergency number, the anonymous tip is received within a predetermined time period of the public-safety incident happening, and the anonymous tip has a priority level above a threshold; and
wherein the step of receiving the anonymous tip comprises the step of receiving the anonymous tip in real time, as a user types the anonymous tip on the device.

* * * * *